June 7, 1960  L. B. NORWOOD ET AL  2,939,186
ENCLOSURE DEVICE

Filed April 9, 1956  3 Sheets-Sheet 1

INVENTORS
LELAND B. NORWOOD
DONALD L. PEARSON
BY
*William L. Parr*
ATTORNEY

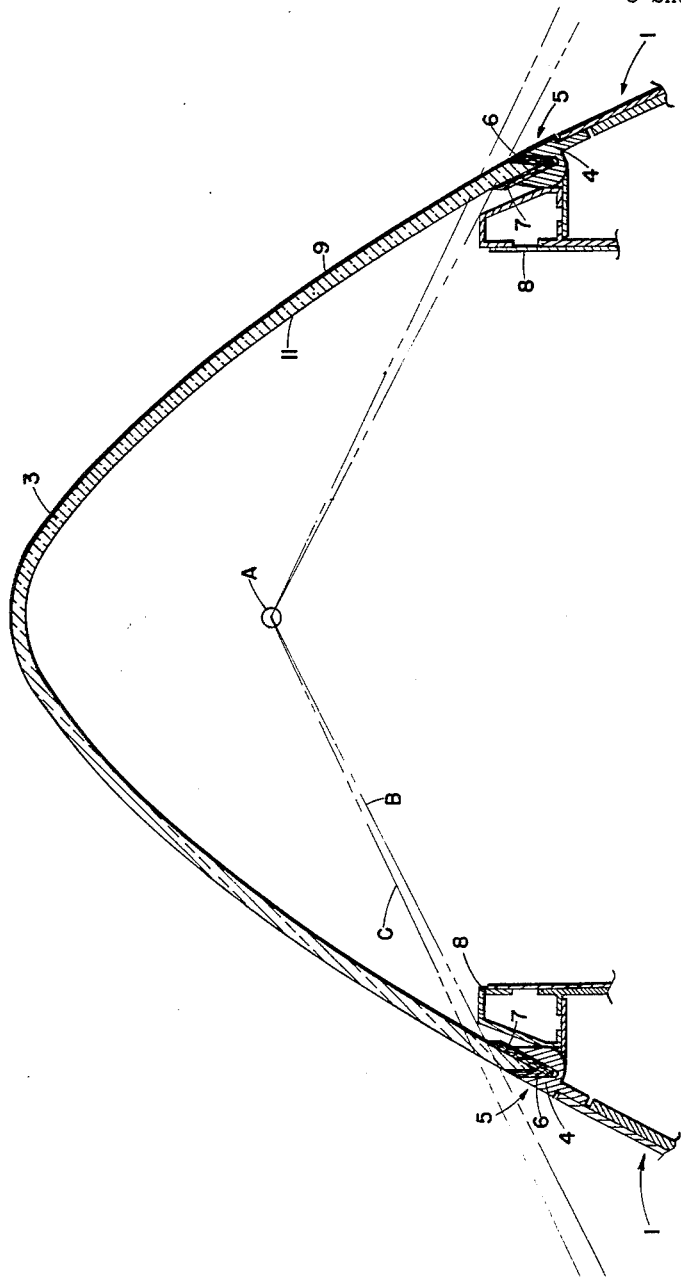

INVENTORS
LELAND B. NORWOOD
DONALD L. PEARSON
BY
*William R. Lane*
ATTORNEY

United States Patent Office 2,939,186
Patented June 7, 1960

2,939,186

ENCLOSURE DEVICE

Leland B. Norwood and Donald L. Pearson, Los Angeles, Calif., assignors to North American Aviation, Inc.

Filed Apr. 9, 1956, Ser. No. 576,959

9 Claims. (Cl. 20—40)

This invention pertains to an enclosure device and more particularly to an aircraft canopy and mounting means therefor.

Aircraft cockpit enclosures are commonly made from large sheets of a synthetic resin formed to a domed configuration to enclose the cockpit. The materials used for the canopy sheet are generally of methyl methacrylate which has a low bearing strength and is subject to cracking under stress concentrations. As speeds of aircraft have increased, canopy design problems have become more severe. Of particular importance is the mounting of the canopy sheet on the framework enclosing the cockpit so as to withstand the forces imposed during the operating conditions encountered. A cockpit enclosure is normally pressurized which provides considerable internal loading on the canopy and the mounting at higher altitudes. Aerodynamic loads on the canopy may cause bending which complicates the mounting problem. Also difficulties are encountered from vibration, moisture and differential expansion between the canopy sheet and the mounting frame.

Beyond these considerations, it is necessary to devise a mounting arrangement for the canopy sheet which will provide a minimum obstruction to the pilot's vision. Obviously excessive overlapping of opaque mounting members on the edge of the transparent canopy will reduce the pilot's vision area. There are further space problems and weight considerations which are of growing importance in modern aircraft. The cramped conditions and limited volume available for the cockpit aggravate the problems of blocking the pilot's vision by the canopy mounting arrangement.

Accordingly it is an object of this invention to provide an aircraft canopy having a mounting arrangement which affords maximum visibility for the pilot.

An additional object of this invention is to provide an enclosure device having maximum strength while resistant to adverse conditions from moisture, vibration and other causes.

Another object of this invention is to provide an enclosure device having a mounting arrangement of compact light weight design.

A further object of this invention is to provide an enclosure device having a construction simple to manufacture and install.

Yet another object of this invention is to provide a mounting arrangement suitable for holding any sheet panel or other member and attaching the same to adjacent structure.

These and other objects will become apparent from the following detailed description taken in connection with the accompanying drawings in which Fig. 1 is a fragmentary perspective view of an aircraft and the canopy therefor;

Fig. 2 is a sectional view taken along line 2—2 of Fig. 1 illustrating the relationship of the pilot's field of vision to the canopy edge mounting;

Generally speaking the device of this invention contemplates the provision of a beveled surface on the outer edge of a canopy sheet member. Oversize holes are provided through this portion of the canopy and additional members are provided on the beveled surface and on the side of the marginal portion of the canopy opposite to this surface. Smaller openings are provided through these additional members and bolts are extended through these openings to attach the canopy to adjacent structure. By reason of the oversize holes in the canopy edge there is no bearing engagement between the bolts and the canopy transparent material itself. The beveled edge surface results in an increased angle of vision for the pilot.

Figure 1:
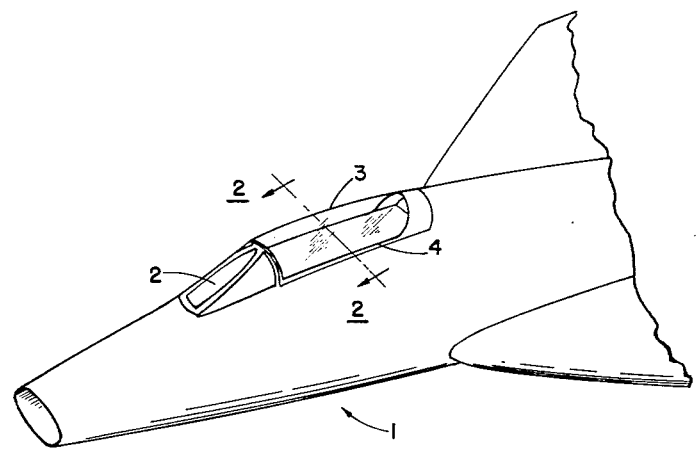

In Fig. 1 there may be seen an aircraft 1 having a windshield 2 and a canopy member 3, the latter two cooperating to enclose the cockpit area. The canopy sheet will normally be made from a synthetic resin such as methyl methacrylate, and is shown attached to a suitable structural frame 4 smoothly faired with the adjacent surface of the aircraft skin.

The relationship of the pilot's field of vision to the canopy and the edge mounting 5 which secures the canopy to the frame may be seen in the sectional view of Fig. 2. The edge mounting arrangement of this invention includes inner and outer load carrying members 6 and 7 which overlap the margins of sheet 3 and are bonded thereto, as will be made more clear hereinafter. By the unique provisions of this invention the outer portion 6 of the mounting extends inwardly from the edge a lesser distance than inner portion 7 thereof. This permits the limit of the pilot's vision to extend from the normal eye position A along line B. This line extends downwardly the maximum amount possible in view of the structural components 8 of the aircraft. If the outer portion of the mounting projected inwardly in the plane of the sheet as far as the inner portion thereof, as is the case with a conventional canopy mounting, the pilot's vision would be restricted to that bounded by line C. This would considerably decrease the amount the pilot may see and would be a serious detriment during flight of the aircraft. The fact that the edge mounting is relatively close to the pilot's eye means that the effect of even a short opaque distance is important to the pilot's vision in viewing objects some distance away.

Figure 3:
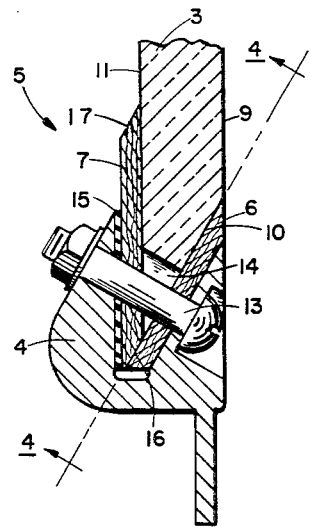
Fig. 3 is an enlarged sectional view illustrating the canopy edge mounting design.

Referring now to Fig. 3, the more detailed construction of the mounting arrangement for the canopy sheet may be seen. The outer side 9 of the sheet is scarfed to provide a beveled surface 10 extending to the maginal edge of the canopy sheet. In the preferred embodiment of this invention the bevel is at thirty degrees to the plane of the canopy sheet and joins inner side 11 of the sheet so as to define in cross section a substantially V-shaped configuration.

Loads are taken out of the canopy primarily in shear by members 6 and 7 which are cemented to the beveled surface 10 and opposite side 11 at the marginal portion of the canopy. It is well known that methyl methacrylate or similar material used for the canopy has a low bearing strength and is susceptible to damage from stress concentrations. Therefore a bolted attachment with such a member is impractical. On the other hand, load carrying members 6 and 7 are of such a design that they possess the necessary strength characteristics for transmitting concentrated loads such as those imposed by bolt connections. Thus tension forces imposed on the canopy are taken in shear along the relatively large bond area where members 6 and 7 are attached to the margin of the sheet. Members 6 and 7 in turn transmit the loads to bolts 13 which connect to the frame 4 of the aircraft structure.

Members 6 and 7 are provided with suitable aligned apertures to receive bolts 13 which extend therethrough to the frame 4. Direct engagement between the fasteners and the canopy is prevented by clearance openings 14 in the margin of the latter at the locations of the bolts. Therefore, the edge portion of the canopy is provided with an aperture 14 in alignment with each fastener used, this aperture being of considerably larger diameter than that of the fastener to provide a clearance opening through which the fastener passes. This assures that the fastener will not bear against the canopy material but will receive its loading only through members 6 and 7.

Figure 4:
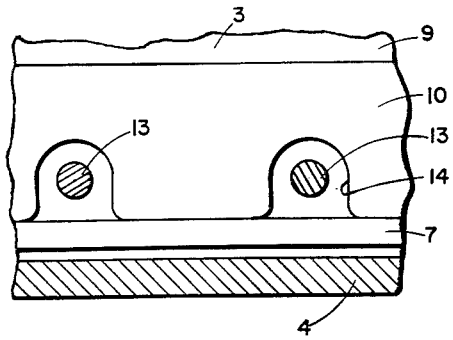
Fig. 4 is a sectional view taken along line 4—4 of Fig. 3.

The form of the clearance apertures may be either the notches of Figs. 3 and 4 or they may be merely large circular openings through the margin of the sheet. The loss of material beneath the bolt resulting from the notched design is inconsequential as far as strength of the joint or the canopy sheet is concerned. If notches are used there will be no possibility that the fasteners will bear against the canopy material regardless of any movement of the joint as tension forces are imposed on the canopy. The circular clearance opening has an advantage in simplicity of fabrication. It is generally preferred to provide a cork rubber gasket 15 between member 13 and the structure to assist in absorbing vibrational loads. To provide a unitary construction it is preferred also to overlap the ends of members 6 and 7 as indicated at 16.

It can be seen by the foregoing that the arrangement described provides a compact connection between the canopy and the load carrying members 6 and 7 whereby no projection beyond the edge of the canopy is necessary. The loads taken from the canopy on side 11 at the margin and on beveled surface 10 are principally in shear so that a joint of maximum strength is obtained. No bearing loads are imposed on the canopy material by virtue of the clearance openings around the fasteners.

An important advantage of the design of this invention results from the provision of beveled surface 10 on the outer portion of the marginal edge of the canopy. It may be noted that the load carrying member 6 projects inwardly in the plane of the canopy sheet from the outer edge thereof less distance than does member 7 on the inner side of the marginal portion. The use of a beveled surface 10 allows this reduction without significant loss in strength at this portion of the joint. The bond area along beveled surface 10 is the equivalent of the bond area along inner side 11 of the marginal portion of the canopy where member 7 is attached. Because the bond is along a surface which is at an angle to the plane of the sheet it need not extend inwardly from the edge of the sheet as far as the surface which is located in that plane in obtaining a comparable bond area. Nevertheless the joint along the bevel takes most of its loading in shear and only a portion in tension so that a high strength joint results. Thus the design of this invention is not only compact by requiring no projections beyond the edge of the canopy, but also the use of a beveled surface considerably increases the pilot's field of vision without significant loss in strength of the joint.

Stress concentrations are avoided by the attachment of members 6 and 7 along the beveled and inner surfaces of the canopy edge. It is generally preferred to chamfer upper edge 22 of member 7 to further reduce stress concentrations where the upper portion of the load carrying member joins the canopy. The chamfered surface reduces the rigidity of member 7 at this portion and therefore significant stress concentrations will not occur.

In fabricating the enclosure of this invention it is preferred to form load carrying members 6 and 7 from laminations of woven fiber or the like suitably attached together. A number of layers of glass cloth or Dacron cloth may be used, for example, impregnated and cemented together with an epoxy resin. These members may be formed separately in molds, providing pre-cured laminates of precision dimensions.

Figure 5:
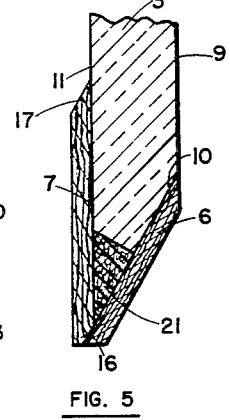
Fig. 5 is a sectional view of the edge attachment during asesmbly with the laminates attached to the edge of the canopy sheet.
Figure 6:
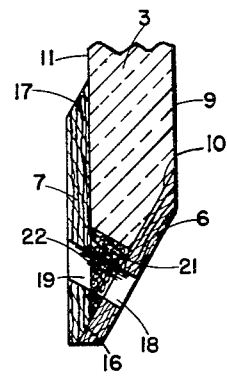
Fig. 6 is a view similar to Fig. 5 but with the bolt apertures through the laminates.

The canopy edge is also prepared by cutting beveled surface 10 at the marginal edge, and providing clearance apertures 14 through this portion of the canopy at locations where the fasteners are to be positioned. Then the pre-cured laminates comprising members 6 and 7 are bonded to the edge portion of the canopy as shown in Fig. 5. Again epoxy resin may be used as the attaching cement. Finally, by means of matched tooling, coaxial openings 18 and 19 are drilled through members 6 and 7 at the locations of the clearance apertures therethrough. These openings are substantially complementary to the fasteners which they are to receive, and located in register with the clearance apertures through the canopy at the central portions thereof. This stage of the construction is shown in Fig. 6.

The epoxy resin which has proved particularly satisfactory is known commercially as Epon 828 as produced by the Shell Chemical Corporation having offices at 500 Fifth Avenue, New York 36, New York. This is an epoxy resin with an epoxide equivalent of 190–210. The epoxide equivalent is the number of grams of resin containing one gram-equivalent of epoxide. For further information on epoxy resins of this type see page 385 of "Protective Coatings for Metals," by Burns and Bradley, Reinhold Publishing Corporation, New York.

Figure 7:
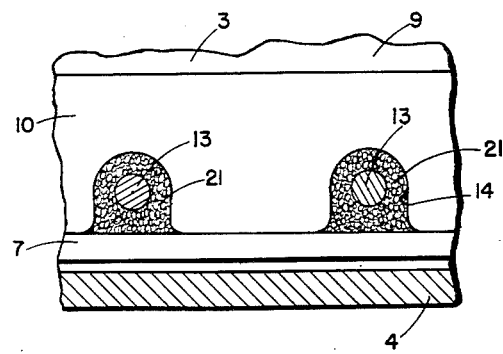
Fig. 7 is a view similar to Fig. 4, but showing the addition of filler plugs in the clearance openings.

In order to prevent the possibility of void areas along the bond line between the load carrying members and the canopy sheet, an excess of the bonding cement should be used. The cement which squeezes out around the margins of the load carrying members can be ground off after it has cured, or wiped off prior to that time, thereby causing no difficulty. However, there is some possibility of the cement squeezing into the clearance openings through which the bolts pass in attaching the canopy to the structure. If the cement within these clearance openings is of any significant quantity, it may, upon curing, provide a means for transmitting bearing loads directly from the fasteners to the canopy material. In other words, the hard, cured cement would have an effect similar to that of a larger fastener extending through the openings which would then no longer provide a clearance aperture. This could result in stress concentrations which would cause failure of the canopy. In order to avoid such a possibility, it is preferred to insert plugs 21 of a crushable material into the clearance openings 14. These plugs are substantially complementary to the openings 14. When the load carrying members are cemented to the marginal portions of the canopy, the plugs prevent cement from squeezing into the clearance openings so that loads will not be transmitted from the bolt directly in bearing to the canopy. When the openings are drilled through the load carrying members 6 and 7, an opening 22 will be made simultaneously in each filler plug as seen in Fig. 6. The crushable nature of the filler plug means that any movement of the bolt within the joint area will transmit no load to the canopy material, but merely will distort the plug and cause no damage. A suitable material for use as a filler plug is cellular cellulose acetate which has a lightweight foam construction, and will both prevent squeeze-out of cement into the clearance opening and will be crushed upon any movement of the bolt within the clearance opening. Fig. 7 provides a sectional view of the completed assembly including the filler plugs.

When filler plugs are included in the clearance openings the following steps are preferred: First the canopy is notched at its edge to provide the clearance openings at the bolt locations. Next laminate 7 is applied to the margin of surface 11. This causes squeeze-out of the cement into the notches as well as along the edges of the laminate. Then plugs 21 are forced into the notches, displacing nearly all of the cement therefrom, while a small amount remains on the surface of each plug. The assembly is then cured, the cement on the plugs serving to retain the same in the notches while not being enough to transmit loads to the canopy sheet in the final assembly. After this the beveled surface 10 is machined on side 11, thereby beveling also the plugs, and laminate 6 applied to that surface. The plugs prevent any additional cement from entering the notches. After a second cure the bolt openings are drilled through the laminates and the plugs, and the canopy is ready for attachment to its frame.

Figure 9:
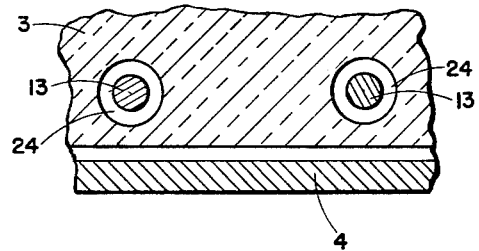
Fig. 9 is a sectional view taken along line 9—9 of Fig. 8.
Figure 8:
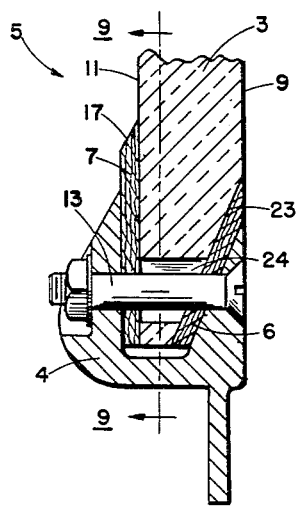
Fig. 8 is an enlarged sectional view of a modified form of edge attachment.
Figure 10:
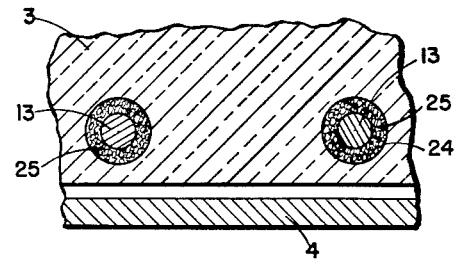
Fig. 10 is a view similar to Fig. 9, but showing the addition of filler plugs in the clearance openings.

According to the modification of Fig. 8, beveled surface 23 at the marginal portion of the canopy sheet extends to the outer edge of the sheet but does not join inner surface 11 at that location. Thus the marginal portion of the canopy is not given a V-shaped configuration as with the previously described embodiment. The design of Fig. 8 may be obtained by using a less severe bevel than the thirty degree arrangement previously described, or it may result from the use of a thicker canopy material. If the bevel angle is reduced, there will be an even higher percentage of load taken in shear and some increase in strength will result. However, less bevel on surface 10 means that the opaque area on the outside of the joint will increase, and the pilot's vision will be cut down correspondingly. With this modification circular clearance openings 24 are illustrated, which may be used alone as shown in Fig. 9, or with filler plugs 25 as seen in Fig. 10. Notches will work as well with this design in providing the clearance openings around the bolts.

Figure 11:
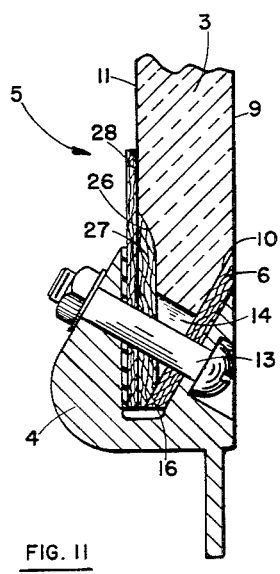
Fig. 11 is an enlarged sectional view of a modified form of edge attachment.

A further modification may be seen in Fig. 11 providing a design which may be used in attaching a relatively thick canopy sheet member within a frame of minimum dimensions. Here the inner surface 11 of the canopy sheet is recessed as at 26 at the marginal portion. Load carrying member 6 on the beveled surface is the same as the previously used members. However, for the inner load carrying member a two-piece assembly may be provided. One pre-cured laminate 27 is bonded to the sheet within the recessed portion thereof, while a second and longer pre-cured laminate 28 overlies the first laminate and the marginal portion of the sheet. The recessed portion of the sheet is received within the structural frame and therefore the latter may be made of a minimum width. The use of the second laminate overlying the outer surface of the first laminate and the marginal portion of the sheet increases the strength of the joint and reduces stress concentration.

It is apparent from the foregoing that we have provided an improved enclosure device wherein a transparent sheet may be attached to adjoining structure in such a manner that not only is strength provided, but also a compact design allowing maximum pilot vision results. The use of clearance openings through the marginal portion of the transparent sheet plus the beveled edge on the outer surface of the canopy member enable these results to be obtained.

The foregoing detailed description is to be clearly understood as given by way of illustration and example, the spirit and scope of this invention being limited only by the appended claims.

We claim:

1. A canopy enclosure for an aircraft comprising a transparent sheet member having a marginal portion, the outer side of said sheet at said marginal portion having a beveled surface extending to the edge of said sheet, said sheet having at least one aperture through said marginal portion thereof extending from said beveled surface to the opposite side of said sheet; a duality of elongated members having greater bearing strength than said transparent sheet, one of said members being attached to said beveled surface and the other to said opposite side at said marginal portion, the said elongated member attached to said beveled surface terminating at said outer side of the sheet at a location closer to the edge of the sheet than the upper end of the member attached to the opposite side of the sheet whereby maximum downward clear visual area coverage is provided, said elongated members having aperture means therethrough in register with and smaller than said aperture in said sheet member; and fastener means extending through said aperture in said sheet and said aperture means in said elongated members for attaching said sheet by means of said elongated members to adjacent structure, said fastener means being substantially complementary to said aperture means in said elongated members, thereby to apply bearing loads only to said elongated members while remaining remote from said sheet member.

2. A device as recited in claim 1 in which said elongated members comprise laminations of fabric impregnated with epoxy resin.

3. A device as recited in claim 1 including in addition a crushable non-load bearing filler plug of cellular cellulose acetate disposed within and complementary to said aperture through said transparent sheet, said filler plug having an aperture therethrough in alignment with and substantially the dimensions of said aperture means in said elongated members.

4. A canopy enclosure for a vehicle compartment comprising a transparent sheet having a marginal portion terminating in a bottom edge, one side of said transparent sheet at said marginal portion having a beveled surface at the edge of said sheet, said sheet being provided with at least one opening therethrough extending from said beveled surface to the opposite side of said sheet at said marginal portion; crushable non-load bearing filler plug means substantially complementary to and disposed within said opening; an elongated load carrying means bonded to said beveled surface and to said opposite side at said marginal portion, said load carrying means bonded to said beveled surface having its upper edge terminating at the said one side of the sheet at a location closer to the bottom edge of the sheet than the upper edge of the member attached to the opposite side of the sheet whereby maximum downward clear visual coverage is provided, said load carrying means and said filler plug means having an aperture therethrough extending from one side to the other of said load carrying means, said aperture being in register with, of smaller lateral dimensions than, and spaced from the periphery of said opening in said sheet member, said aperture through said load carrying means being thereby adapted to receive a fastener for transmitting loads from said transparent sheet to said fastener while precluding engagement of said fastener with said transparent sheet.

5. A device as recited in claim 4 in which said load carrying means comprise resin impregnated laminations of woven fiber.

6. A canopy enclosure device for a compartment of a vehicle comprising a transparent plastic sheet adapted for association with said vehicle so as to confine at least portions of said compartment, the outer side of said transparent sheet at the marginal portion thereof being provided with a beveled surface extending to the edge of said sheet, said transparent sheet being provided with aperture means therethrough extending from said beveled surface to the opposite side thereof at said marginal portion; a resin impregnated lamination of woven fiber bonded to said beveled surface along said marginal portion of said sheet at said edge thereof, said lamination overlying said aperture means; a second resin impregnated lamination of woven fiber bonded to the inside of said sheet extending along said marginal portion at said edge thereof and overlying said aperture means, said lastly mentioned lamination extending inwardly from said edge of said sheet in the plane of said sheet a greater distance than the extent inwardly in said plane of the other lamination, said laminations having coaxial apertures therethrough, said apertures being in register with, of smaller lateral dimensions than, and remote from the periphery of said aperture means in said transparent sheet, whereby said aperture means in said laminations are adapted to receive fasteners for transmitting loads from said sheet to said fasteners without engagement between said fasteners and said sheet.

7. A device as recited in claim 6 in which said aperture means through said transparent sheet comprises a notch extending inwardly of said sheet from said edge thereof.

8. A canopy enclosure device comprising a transparent sheet member, one side of said sheet member at the marginal portion thereof being provided with a beveled surface extending to the edge of said sheet so as to provide said marginal portion with a substantially V-shaped cross section, aperture means through said transparent sheet at said marginal portion extending from said beveled surface to the opposite side of said sheet; laminated members of woven fiber complementary to said marginal portion of said sheet and bonded thereto so as to overlie said aperture means, the one of said laminated members bonded to said opposite side of the sheet extending inwardly from the edge of said sheet in the plane of the sheet a greater distance than the extent inwardly in said plane of the other lamination, said laminated members having aperture means therethrough extending from one side to the other of said sheet member, the projections of said lastly mentioned aperture means on said transparent sheet being entirely within the confines of said aperture means in said transparent sheet, whereby said aperture means in said laminated members are adapted to receive fasteners for transmitting loads from said transparent sheet to said fasteners.

9. An aircraft canopy enclosure comprising a dome-like transparent sheet member having a marginal portion adapted for connection with an aircraft to enclose a portion of the same, the outer side of said sheet at said marginal portion providing an inwardly beveled surface extending to the edge of said sheet to define a substantially V-shaped cross section; a duality of precured laminates of fabric impregnated with epoxy resin extending continuously along said marginal portion, one of said laminates being complementary and cemented to said beveled surface, the other of said laminates being complementary and cemented to the inner side of said sheet, said other laminate extending from said edge of said sheet in the direction of the plane of said sheet a greater distance than such extent of said laminate on said beveled surface, said laminates overlapping at said edge of said sheet, said laminates further being provided with a series of laterally spaced coaxial apertures therethrough adapted for receiving fasteners for attaching said sheet to an aircraft, said sheet having a notch in said edge at the location of each of said coaxial apertures, each notch being in register with a pair of coaxial apertures and of larger dimensions than the same so that a fastener received by said coaxial apertures engages said laminates and is remote from said sheet; and a light weight crushable filler plug in each notch, said plugs being substantially conterminous with said notches and provided with apertures therethrough in alignment with and substantially the dimensions of said coaxial apertures.

References Cited in the file of this patent

UNITED STATES PATENTS

| | | |
|---|---|---|
| 2,654,685 | Voelker | Oct. 6, 1953 |
| 2,659,462 | Schwartz et al. | Nov. 17, 1953 |
| 2,696,451 | Snyder | Dec. 7, 1954 |
| 2,730,777 | Koriagin | Jan. 17, 1956 |
| 2,731,220 | Power | Jan. 17, 1956 |
| 2,760,898 | Voelker | Aug. 28, 1956 |
| 2,784,926 | Bonza et al. | Mar. 12, 1957 |

FOREIGN PATENTS

| | | |
|---|---|---|
| 484,372 | Canada | June 24, 1952 |